Figure 1:
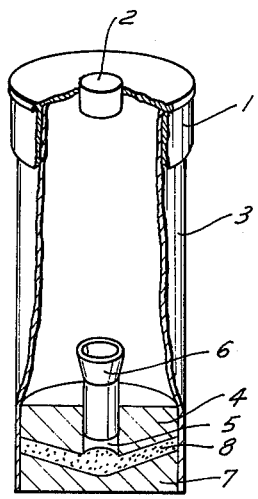

United States Patent [19]
Persson

[11] 3,973,498
[45] Aug. 10, 1976

[54] INITIATION DEVICE FOR EXPLOSIVE CHARGE

[75] Inventor: Ingemar Per Persson, Huddinge, Sweden

[73] Assignee: Nitro-Nobel A.B., Gyttorp, Sweden

[22] Filed: May 22, 1974

[21] Appl. No.: 472,102

[30] Foreign Application Priority Data
May 28, 1973 Sweden .............................. 7307463

[52] U.S. Cl. ............................... 102/24 R; 102/45; 72/56
[51] Int. Cl.² .......................................... F42B 1/00
[58] Field of Search ................................ 102/22–24, 102/29, 45, 86.5; 89/1B; 29/421 E, 470.2; 72/56

[56] References Cited
UNITED STATES PATENTS

| | | | |
|---|---|---|---|
| 3,007,409 | 11/1961 | Broske | 102/45 X |
| 3,036,374 | 5/1962 | Williams | 29/421 E |
| 3,316,627 | 5/1967 | Suzuki et al. | 29/421 E |
| 3,351,019 | 11/1967 | Schoadt et al. | 102/86.5 |
| 3,437,036 | 4/1969 | Franzen et al. | 102/24 HC |
| 3,566,646 | 3/1971 | Walkup | 29/470.2 |

FOREIGN PATENTS OR APPLICATIONS

| | | | |
|---|---|---|---|
| 498,962 | 11/1919 | France | 102/86.5 |
| 1,577,087 | 1/1970 | Germany | 102/23 |

*Primary Examiner*—Verlin R. Pendegrass
*Attorney, Agent, or Firm*—Hane, Baxley & Spiecens

[57] ABSTRACT

There is disclosed a spot welding device for spot welding metal parts by explosive force. The device comprises two plugs tightly fitted into a rigid tubular member and so spaced and shaped that a transverse substantially conical space is formed between the two plugs. This space is filled with a suitable explosive material which can be exploded by a detonator activated when desired by an igniter. The explosive force generated upon detonation of the explosive material produces a generally annular spot weld when the device is placed with one of its ends upon metal parts to be welded.

3 Claims, 2 Drawing Figures

INITIATION DEVICE FOR EXPLOSIVE CHARGE

The present invention relates to an initiation or detonating device for explosive charge which is thus preferably and particularly suited for use in connection with blast welding e.g. of two or more metal plates one put on top of the other. Heretofore an explosive charge was placed onto a metal plate in some way or other and also arranged to connect the charge to a detonator or fuze. This manner of arranging blast welding as now known is complex and time consuming and the object of the present invention is to eliminate the time consuming steps by providing an initiation device, which is easy to fire by means of a tool or in some similar manner.

According to a particular embodiment of the invention the device may be constituted by a conventional shot-gun cartridge, which is completely emptied of its content with the exception of its percussion igniter or detonator. Inside the cartridge there is provided a detonator such that it may receive the flame of the igniter, when the latter is initiated. The detonator is arranged at the open end of the shot-gun cartridge and at this end an explosive charge is placed.

If the cartridge end with the explosive is held against an outer surface on the plates which are to be welded together and the igniter is initiated, a spot weld is obtained.

If the explosive charge according to the present invention has a conical shape, with its top pointed towards the open end of the shot-gun cartridge, an annular or ringformed weld is achieved upon ignition of the cartridge.

According to the invention the cartridge may at its open end be sealed with a plug of inert material, which has an internal interspace, which is covered with a layer of explosive. At an inner open side of said layer of explosive the previously mentioned detonator is located.

According to a further development of the invention one may utilize a cup of inert material, the bottom of which is not flush but has a cavity e.g. in the shape of a cone. At the bottom a layer of explosives is arranged. Then the cup is provided with a cover, the inner side of which is designed such that it is in contact with said layer of explosives. The cover is also provided with a central bore for the explosive initiating means. The initiating means may e.g. comprise an electrical detonator, a fuze or a tube-shaped initiation device, which serves as a shock wave guide.

Figure 2:
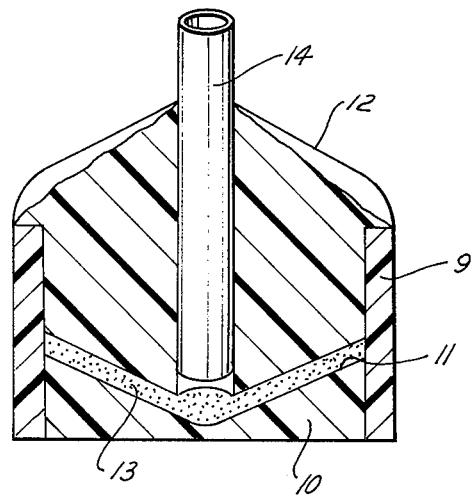

The present invention will be described in more detail in connection with the accompanying drawings, where FIG. 1 shows a conventional shot-gun cartridge converted to an initiation device according to the present invention and where FIG. 2 shows an example of how the free end of the cartridge may be sealed.

In the figures are shown a cartridge cap 1, which at is upper end is provided with a percussion igniter 2. To the cap 1 is fastened a tubular cardboard sleave 3, into the fuze end of which is inserted a disc or plug 4 of inert material, with a conical surface facing the opening of the sleeve.

The disc 4 has a center hole 5, in which is placed a detonator 6 of conventional type. It may e.g. consist of an aluminum tube containing lead acide. The detonator 6 has its opening turned toward the ignitor 2 so that it may receive an initiative flame from the ignitor 2. Below the disc 4 there is inserted a second disc or plug 7, which has a conical inner surface correspondng to the conical end surface of the disc 4, so that when the discs 4 and 7 are inserted opposite to each other, a slot or cavity of even thickness is obtained. Said slot is filled with explosives 8 of suitable type, e.g. pentyl of the like.

The described device functions in the following manner: When the cartridge is located with its lower end in contact with a package of metal plates and the ignitor is initiated, a flame of fire from the ignitor will hit the detonator 6, which in turn will initiate the explosive charge 8, whereby a spot blast weld is obtained, which has the shape of a ring on account of the conical form of the explosive charge.

It should be obvious that the above described device may have a number of different embodiments assuming that the function remains unchanged. Thus other types of sleeves and igniters may be used, but it is of course easier to use conventional shot-gun cartridges. The sleeve section does not have to be circular but may have any suitable shape. The explosive charge need not be cone shaped but may have any suitable configuration. The above described cartridge is particularly suitable for insertion into a tool with a trigger mechanism, which can initiate the igniter. With the tool and cartridge according to the invention one obtains an extremely simple device for spot welding by means of explosive jointing.

In connection with FIG. 1 it has been stated that two discs of inert material may be used. Instead of two discs one may, as shown in FIG. 2, use a more or less can shaped unit, which is provided with a cover to be inserted into the open end of the can. The can shaped unit may be made entirely of an inert material, e.g. plastic. The embodiment of FIG. 2 comprises a cylindrical can with a tubular wall 9 and a bottom 10, which is designed so that it has an internal cavity 11, which preferably is conical. The can is provided with a lid 12, which internally is formed in such a way that a conical slot 13 is obtained when the can lid is put in place. The can lid has a center bore 14. A means of initiation can thus be inserted into said bore e.g. a detonator, a fuze or a shock wave guide.

The embodiment shown in FIG. 2 is of such a type that it may be used for several types of applications and thus not only in connection with the sleeve, shown in FIG. 1. Thus one may when blast jointing plates use a number of cans according to FIG. 2 and provide same with a means of ignition for their initiation. It also may be possible to arrange a holding member for a large number of cans. If large plates are to be spot welded, one may use a number of transverse holding members, which are stationary and into which the cans are placed. The plates to be spot welded may then be moved underneath the holding members.

I claim:

1. A spot welding device for spot welding metal parts by explosive force, said device comprising:

a rigid tubular member open at both ends; a rigid first plug tightly fitted into one end of said tubular member; a rigid second plug tightly fitted into said tubular member axially spaced from said first plug, said plugs defining therebetween a transversely elongate closed space of generally conical shape, the apex of said space facing the first plug; explosive material in said conically shaped space; a detonator for detonating said explosive material disposed in the tubular member on the side of the second plug facing the other plug; ignition means at said other end of the tubular member and coacting with said detonator so as to activate the same upon activation of the ignition means, thereby causing explosion of the explosive material, the axial thicknesses of the plugs and the location of said space being so correlated that the major portion of an explosive force generated upon explosion of the explosive material acts upon the first plug, thereby causing a spot weld of generally annular configuration when the said one end of the tubular member is placed upon metal parts to be spot welded.

2. The spot welding device according to claim 1 wherein the side of the second plug facing the first plug has a protruding conical shape and the side of the first plug facing the second plug has a recessed conical shape.

3. The spot welding device according to claim 1 wherein said ignition means, upon ignition thereof, is arranged to direct a flame upon the detonator substantially coaxially with said tubular member.

* * * * *